United States Patent
Henderson et al.

(10) Patent No.: US 6,411,001 B1
(45) Date of Patent: Jun. 25, 2002

(54) VARIABLE RATIO ANGLED MAGNETIC DRIVE

(75) Inventors: J. Kirston Henderson, Fort Worth; Boyd B. Bushman, Lewisville, both of TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/686,400

(22) Filed: Oct. 9, 2000

(51) Int. Cl.[7] .......................... H02K 7/10; H02K 49/00; H02P 15/00; H02P 21/12
(52) U.S. Cl. ................ 310/103; 310/156.01; 310/75 R; 310/101
(58) Field of Search ................ 310/75 R, 104, 310/103, 105, 152, 156.01, 102 A, 101, 106, 107, 40 R, 10, 1; 74/DIG. 4, 416; 335/306

(56) References Cited

U.S. PATENT DOCUMENTS

| | | | | |
|---|---|---|---|---|
| 2,167,641 A | * | 8/1939 | Dewan | 310/103 |
| 2,722,617 A | * | 11/1955 | Cluwen et al. | 310/103 |
| 3,523,204 A | * | 8/1970 | Rand | 310/103 |
| 3,730,488 A | * | 5/1973 | Gardner, Jr. et al. | 310/103 |
| 3,895,245 A | * | 7/1975 | Bode | 310/103 |
| 4,167,684 A | * | 9/1979 | Kelly | 310/103 |
| 4,169,983 A | * | 10/1979 | Felder | 310/103 |
| 4,486,176 A | * | 12/1984 | Tardieu et al. | 433/133 |
| 5,376,862 A | * | 12/1994 | Stevens | 310/103 |
| 5,481,146 A | * | 1/1996 | Davey | 310/154.05 |
| 5,514,926 A | | 5/1996 | Bushman | 310/105 |
| 5,834,872 A | * | 11/1998 | Lamb | 310/103 |
| 5,886,608 A | * | 3/1999 | Chabay | 310/1 |
| 6,194,798 B1 | * | 2/2001 | Lopatinsky | 310/63 |
| 6,263,664 B1 | * | 7/2001 | Tanigawa et al. | 60/39.54 |

FOREIGN PATENT DOCUMENTS

| | | | |
|---|---|---|---|
| JP | 358170964 A | * | 10/1983 |
| JP | 61132069 A | * | 6/1986 |
| JP | 402102947 A | * | 4/1990 |

* cited by examiner

Primary Examiner—Nestor Ramirez
Assistant Examiner—Guillermo Perez
(74) Attorney, Agent, or Firm—Baker Botts L.L.P.

(57) ABSTRACT

The present invention encompasses an angled magnetic drive that includes a motor for generating rotary motion about a first axis. This angled magnetic drive also includes a driving member coupled to the motor and rotated by it. The driving member includes a plurality of magnets coupled to one of its faces. This magnetic drive additionally includes a driven member that is mounted to rotate about a second axis, which is oriented at an angle to the first axis. At least part of a face of the driven member is located in proximity to the face of the driving member such that the driven member is magnetically coupled to the driving member when the motor rotates the driving member thereby causing the driving member to rotate, the rotation of the driving member producing rotation of the driven member.

16 Claims, 3 Drawing Sheets

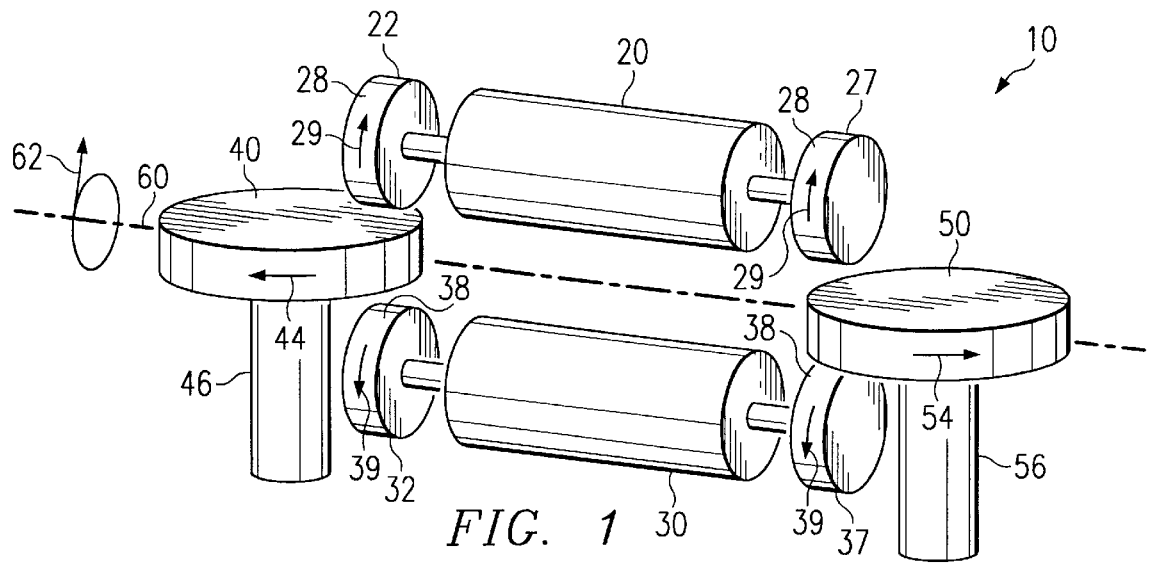
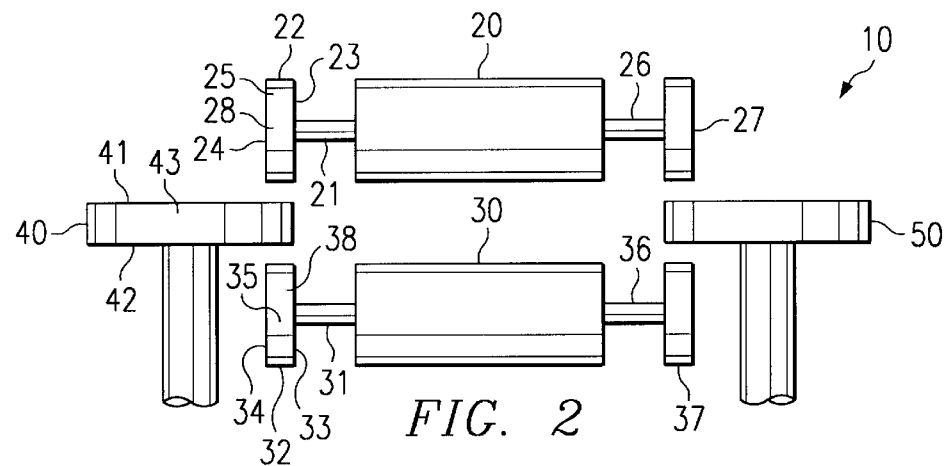
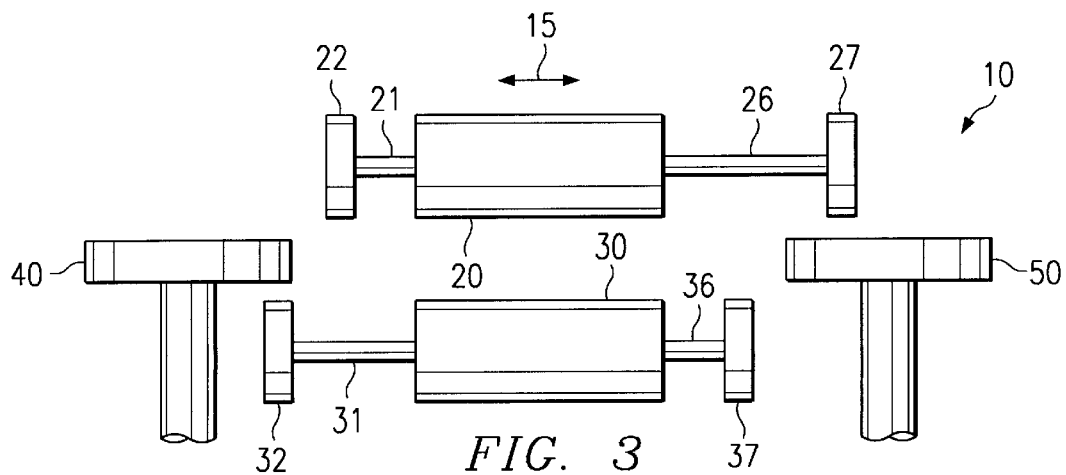

001B1

VARIABLE RATIO ANGLED MAGNETIC DRIVE

TECHNICAL FIELD OF THE INVENTION

This invention relates to drive mechanisms and, in particular, to magnetic drives.

BACKGROUND OF THE INVENTION

Mechanical gears for transferring rotary power about one axial direction to about another axial direction are well known in the gearing art. For example, a bevel gear, which typically has gear teeth projecting from the side of one axial element and gear teeth projecting along another axial element, is typically used to transfer rotary power at right angles.

Unfortunately, mechanical gears have several disadvantages. One disadvantage is mechanical wear due to the interaction of the gear teeth on one element with the gear teeth on the other element. Another disadvantage is the inability to readily vary the amount of power transferred from one element to the other element. A further disadvantage occurs if the gears are to be disengaged and engaged, because some type of clutch, mechanical or fluid, must also be added, increasing the cost and complexity. Still another disadvantage is the complexity encountered when two motors are driving the same element simultaneously.

SUMMARY OF THE INVENTION

The present invention substantially reduces or eliminates at least some of the problems and disadvantages associated with conventional mechanical gears for transferring rotary power about one axial direction to about another axial direction. To achieve this, the present invention, in particular embodiments, provides a variable ratio angled magnetic drive.

In certain embodiments, the present invention provides an angled magnetic drive. The magnetic drive includes a motor that is operable to generate rotary motion about a first axis. The magnetic drive also includes a driving member that is coupled to the motor and rotated by it. The driving member includes a plurality of magnets coupled to one of its faces. The magnetic drive additionally includes a driven member mounted to rotate about a second axis oriented at an angle to the first axis. At least part of a first face of the driven member is located in proximity to the face of the driving member, such that the driven member is magnetically coupled to the driving member when the motor rotates the driving member, the rotation of the driving member producing rotation of the driven member.

In other embodiments, the present invention provides a second angled magnetic drive. This magnetic drive includes a first motor that is operable to generate rotary motion at a motor shaft about a first axis, and a first driving member that is coupled to the motor shaft to rotate about the first axis. The first driving member includes a plurality of magnets coupled to one of its faces. The magnetic drive also includes a second motor that is operable to generate rotary motion at a motor shaft about a second axis, and a second driving member that is coupled to the motor shaft of the second motor to rotate about the second axis. The second driving member includes a plurality of magnets coupled to one of its faces. The magnetic drive additionally includes a driven member mounted to rotate about a third axis oriented at an angle to the first axis and the second axis. At least part of a first face of the driven member is located in proximity to the face of the first driving member, and at least part of a second face of the driven member is located in proximity to the face of the second driving member. The driven member is magnetically coupled to the first driving member when the first motor rotates the first driving member and to the second driving member when the second motor rotates the second driving member, such that the rotation of one or both of the first driving member and the second driving member produces rotation of the driven member.

The present invention provides several technical advantages. For example, because a drive constructed in accordance with the present invention does not use mechanical gears to transfer rotary power between a driving member and a driven member, the drive is not susceptible to mechanical wear due to the interaction of gear teeth between elements. Another advantage is the ability, at least in certain embodiments, to readily vary the ratio between a driving element and a driven member. This allows the power being transferred to the driven member to be readily and/or smoothly varied. An additional advantage is the ability to readily engage and disengage a driving member and a driven member. A further advantage of the present invention is the ability to drive one driven member by two different driving members, thereby providing redundancy in case one of the motors fails.

Other technical advantages will be readily apparent to one skilled in the art from the following figures, description, and claims.

BRIEF DESCRIPTION OF THE DRAWINGS

The following drawings provide a more complete understanding of the present invention, especially when viewed in conjunction with the following detailed description, and also illustrate further features and advantages of the present invention:

FIG. 1 illustrates one embodiment of an angled magnetic drive in accordance with the present invention;

FIG. 2 provides a two dimensional view of the angled magnetic drive of FIG. 1;

FIG. 3 illustrates the angled magnetic drive of FIG. 1 in another mode of operation;

DETAILED DESCRIPTION OF THE INVENTION

Figure 4:
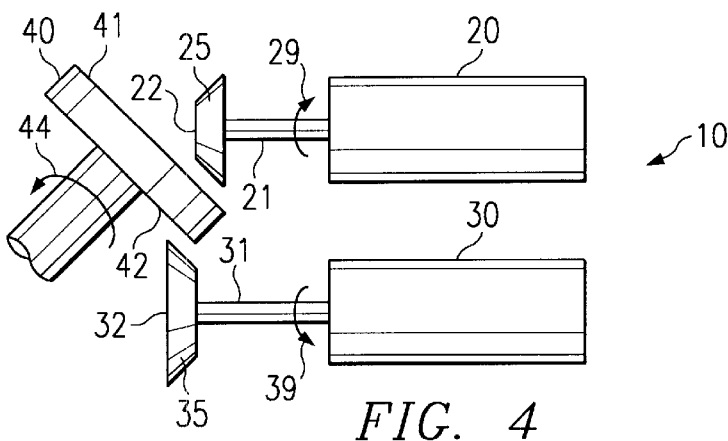
FIG. 4 illustrates an alternative embodiment of the angled magnetic drive of the present invention.

FIG. 1 illustrates one embodiment of an angled magnetic drive 10 in accordance with the present invention. In general, angled magnetic drive 10 includes a first motor 20, a second motor 30, a first driven member 40, and a second driven member 50. Each of first motor 20 and second motor 30 can drive both of first driven member 40 and second driven member 50 or one or the other of first driven member 40 and second driven member 50.

In more detail, the first motor 20 provides rotating motion to a first driving member 22 and a second driving member 27, and second motor 30 provides rotating motion to a first driving member 32 and a second driving member 37. First driving member 22 includes a plurality of magnets 28 spaced around the periphery thereof, and second driving member 27 includes a plurality of magnets 28 spaced around the periphery thereof. Likewise, first driving member 32 includes a plurality of magnets 38 spaced around the periphery thereof, and second driving member 37 includes a plurality of magnets 38 spaced around the periphery thereof.

As illustrated, the first driven member 40 is positioned to rotate between first driving member 22 and first driving member 32. Likewise, the second driven member 50 can be positioned to rotate between second driving member 27 and second driving member 37. Also as illustrated, the first driven member 40 is oriented at a substantially right angle to first driving member 22 while remaining in close proximity to the periphery of first driving member 22 and oriented at a substantially right angle to first driving member 32 while remaining in close proximity to the periphery of first driving member 32. However, neither first driving member 22 nor first driving member 32 contacts first driven member 40. In particular embodiments, there is approximately one-tenth of an inch of clearance between the first driven member 40 and the periphery of first driving member 22 and between the first driven member 40 and the periphery of first driving member 32. Second driving member 27, second driving member 37, and second driven member 50 are arranged similarly.

Coupled to first driven member 40 and second driven member 50 is a shaft 46 and a shaft 56, respectively. Shaft 46 and shaft 56 provide rotary motion to the ultimate load device or another rotary motion transfer device. Thus, first driven member 40 and second driven member 50 can transmit rotary power along the direction of shaft 46 and shaft 56, respectively.

In particular embodiments, shaft 46 and shaft 56 are supported in bearings, which hold the shafts and, hence, first driven member 40 and second driven member 50 in place relative to first motor 20 and second motor 30. In some of these embodiments, shaft 46 and shaft 56 are connected to aerodynamic devices, such as fan blades or propellers. The rotation of these aerodynamic devices provide lift, thrust, and/or attitude control for an aircraft. In certain embodiments, angled magnetic drive 10 is rotated, for example, about axis 60 in the direction of arrow 62, to provide vertical thrust to facilitate lifting the aircraft from the ground and horizontal thrust to propel the aircraft when airborne. In general, angled magnetic drive 10 may be rotated about any other axis to alter the orientation of the axis about which the rotary power is transmitted.

First motor 20 and second motor 30 may be gas turbine engines, reciprocating engines, electric motors, or any other type of device that can produce a rotary motion. In addition, driving members 22, 27, 32, and 37 may be solid discs, hollow discs, plates, or other shapes or configurations. Further, driving members 22, 27, 32, and 37 may be composed of copper, aluminum, brass, or any other type of nonmagnetic material. In a particular embodiment, driving members; 22, 27, 32, and 37 are shaped as circular disks with a radius of twelve inches and a thickness of two inches and formed of aluminum. The magnets 28 and 38 coupled to the driving members may be NdFeB magnets or any other type of permanent magnets. Magnets 28 and 38 may be adhered to, bonded to, embedded in, molded with, or otherwise coupled to the driving members. First driven member 40 and second driven member 50 may be solid discs, hollow discs, plates, or other shapes or configurations. Further, first driven member 40 and second driven member 50 may be composed of copper, aluminum, brass, or any other type of conductive, diamagnetic material, which is a material that is nonmagnetic but in which an electric current can be induced by a magnetic field passing relative to the material. In particular embodiments, driven members 40 and 50 are the ultimate load devices of angled magnetic drive 10.

In one mode of operation of the embodiment shown in FIG. 1, first motor 20 rotates first driving member 22 in a counterclockwise direction, in the direction of arrow 29. The rotation of first driving member 22 relative to first driven member 40 induces an electric current in first driven member 40, due to the movement of magnets 28 relative to first driven member 40. This electric current, in turn, produces an induced magnetic field in first driven member 40. The magnetic fields from magnets 28 of first driving member 22 interact with the induced magnetic field in first driven member 40, thereby producing rotation of first driven member 40 counterclockwise, in the direction of arrow 44. At the same time, second motor 30 rotates first driving member 32 in a clockwise direction, in the direction of arrow 39. Thus, first driving member 22 and second driving member 32 are counter-rotating to each other. The rotation of first driving member 32 relative to first driven member 40 also produces an electric current in first driven member 40, due to the movement of magnets 38 relative to first driven member 40. This electric current produces an induced magnetic field that interacts with the magnetic field from magnets 38 of first driving member 32, thereby rotating first driven member 40. Thus, as shown in FIG. 1, first driving member 22 and first driving member 32 can both rotate first driven member 40. Note, however, that either first driving member 22 or second driving member 32 can rotate first driven member 40.

Also in this mode of operation, first motor 20 rotates second driving member 27 counterclockwise, in the direction of arrow 29, and second motor 30 rotates second driving member 37 clockwise, in the direction of arrow 39. Thus, second driving member 27 and second driving member 37 are counter-rotating to each other. As with first driving member 22 and first driven member 40, second driving member 27 induces an electric current in second driven member 50 by rotating magnets 28 relative to second driven member 50. This electric current induces a magnetic field in second driven member 50, which interacts with the magnetic field produced by magnets 28 of second driving member 27. The interaction between these two magnetic fields causes second driven member 50 to rotate counterclockwise, in the direction of arrow 54. Likewise, the rotation of second driving member 37 relative to second driven member 50 induces an electric current in second driven member 50 that produces an induced magnetic field, which interacts with the magnetic field produced by magnets 38 of second driving member 37, thereby rotating second driven member 50 counterclockwise, in the direction of arrow 54. Thus, as shown in FIG. 1, second driving member 27 and second driving member 37 can both rotate second driven member 50. Note, however, that either second driving member 27 or second driving member 37 can rotate second driven member 50.

Although illustrated as counter-rotating in FIG. 1, second driven member 40 and second driven member 50 could also be co-rotating. For example, if first motor 20 rotates second driving member 27 clockwise, in the direction opposite arrow 29, and second motor 30 rotates second driving member 37 counterclockwise, in the direction opposite arrow 39, second driven member 50 would rotate clockwise, in the direction opposite of arrow 54, thus making first driven member 40 and second driven member 50 co-rotating.

FIG. 2 illustrates a two dimensional view of angled magnetic drive 10. As illustrated, first motor 20 includes a first shaft 21 and a second shaft 26. First shaft 21 is coupled to the first driving member 22, and second shaft 26 is coupled to second driving member 27. The first driving member 22 includes a first face 23, a second face 24, and a rim 25. Magnets 28 are positioned around the surface of rim 25. Second driving member 27 has a similar configuration. Likewise, second motor 30 includes a first shaft 31 and a second shaft 36. First shaft 31 is coupled to first driving member 32, and second shaft 36 is coupled to second driving member 37. The first driving member 32 includes a first face 33, a second face 34, and a rim 35. Magnets 38 are positioned around the surface of rim 35. Second driving member 37 has a similar configuration. In addition, the first driven member 40 includes a first face 41, a second face 42, and a rim 43. Second driven member 50 has a similar configuration.

As shown in FIG. 2, rim 25 of first driving member 22 and rim 35 of second driving member 32 are on opposite sides of first driven member 40. In addition, first face 23 of first driving member 22 and first face 33 of second driving member 32 are aligned with rim 43 of first driven member 40. When first driving member 22 and second driving member 32 are so aligned, they produce approximately the maximum amount of torque on first driven member 40. As can be seen, second driving member 27 and second driving member 37 are similarly aligned with respect to second driven member 50.

In another possible embodiment, magnets, such as magnets 28, may be coupled to a face, or faces, of a driven member, such as first face 41 of driven member 40. In the operation of such an embodiment, the driven member is driven by the interaction of the magnetic fields of the magnets in the driving member, such as first driving member 22, and in the driven member rather than depending solely upon the induced magnetic field in the driven member.

Referring to FIG. 3, there is shown the angled magnetic drive 10 in another mode of operation. In this mode, first driving member 22 is moved towards first motor 20, along the direction of arrow 15, by retracting first shaft 21. In addition, second driving member 27 is moved away from first motor 20 by extending second shaft 26. The movement of first driving member 22 towards first motor 20, and away from first driven member 40, causes a decrease in the magnetic coupling between first driving member 22 and first driven member 40. On the other hand, the movement of second driving member 27 towards the center of second driven member 50 does not significantly decrease the magnetic coupling between second driving member 27 and second driven member 50, but does decrease the radius ratio between second driving member 27 and second driven member 50, thereby reducing the amount of power transferred. The movement of the shafts may be accomplished by using a conventional spline drive; however, any other type of drive that can provide linear translation of the shafts can be used. As also shown in FIG. 3, second driving member 37 has been moved towards second motor 30 by retracting second shaft 36. Thus, as illustrated, first motor 20 is principally driving second driven member 50, although at a reduced radius ratio, and second motor 30 is principally driving first driven member 40.

Accordingly, FIG. 3 illustrates that either the first motor 20 or the second motor 30 can drive one of first driven member 40 and second driven member 50 while the other motor is driving the other of first driven member 40 and second driven member 50. Also, as illustrated in FIG. 1, first motor 20 and second motor 30 can drive both first driven member 40 and second driven member 50. Thus, by manipulating first shaft 21, second shaft 26, first shaft 31, and second shaft 36 along the direction of arrow 15, the amount of rotary power transmitted to first driven member 40 and second driven member 50 is varied. In a particular embodiment, either the first motor 20 or second motor 30 drives both first driven member 40 and second driven member 50.

Angled magnetic drive 10 provides several technical advantages. For example, angled magnetic drive 10 does not use mechanical gears to transfer rotary power between the driving members and the driven members. Thus, magnetic drive 10 is not susceptible to mechanical wear due to the interaction of gear teeth between elements. Another advantage of magnetic drive 10 is the ability to readily vary the ratio between the driving members and the driven member. This allows for smooth, continuous, and/or rapid adjustment of the rotary power coupled to the driven members. In addition, the rotation of the driven members can be throttled without changing the rotation rate of the driving members, allowing for rapid increases in the rotary power coupled to the driven members. In embodiments where first motor 20 and second motor 30 drive both first driven member 40 and second driven member 50 simultaneously, one shown in FIG. 1, angled magnetic drive 10 provides redundancy because if one of the motors fails, the other motor can continue to drive both first driven member 40 and second driven member 50, although perhaps at a reduced rate due to the increased load.

FIG. 4 illustrates an alternative embodiment of angled magnetic drive 10. In this embodiment, rim 25 of first driving member 22 and rim 35 of first driving member 32 are beveled. In addition, first driven member 40 is oriented at an angle with respect to earlier depictions of this element, to keep first face 41 and second face 42 substantially parallel to rim 25 and rim 35, respectively. Thus, when either first motor 20 rotates first shaft 21 in the direction of arrow 29 or second motor 30 rotates first shaft 31 in the direction of arrow 39, first driven member 40 rotates in the direction of arrow 44. Accordingly, this embodiment illustrates one method by which angled magnetic drive 10 couples rotary power from one direction to another direction at an angle other than ninety degrees.

Figure 5:
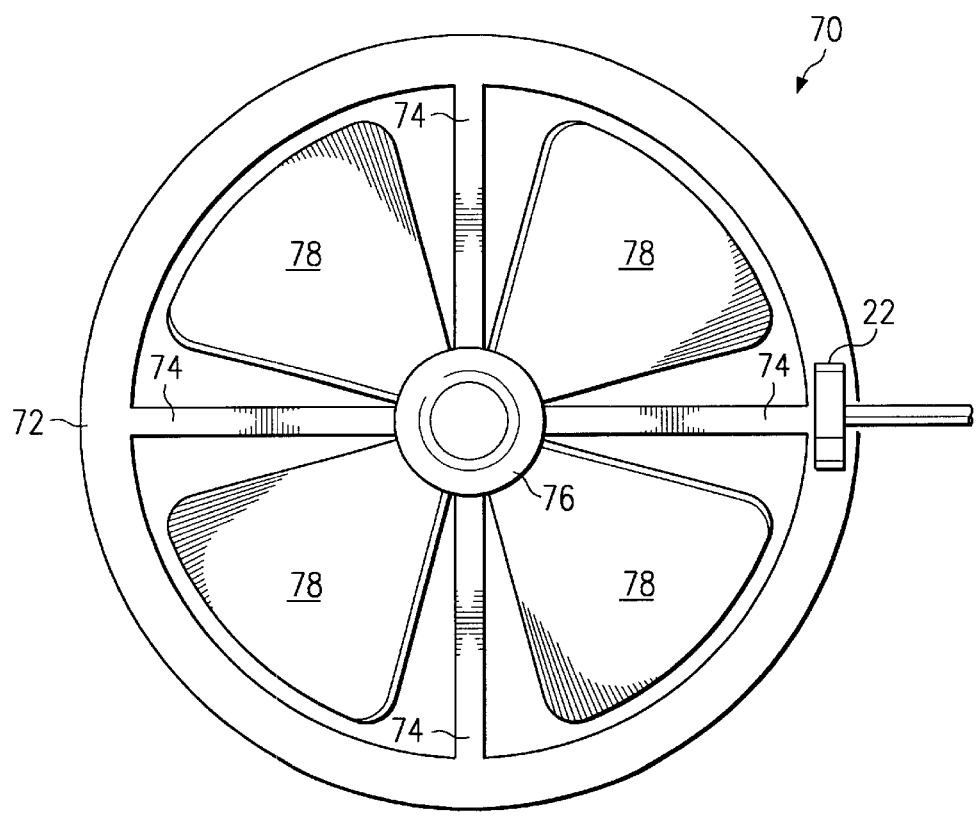
FIG. 5 illustrates an alternative embodiment of a driven member for a drive in accordance with the present invention.

FIG. 5 illustrates an alternative embodiment for a driven member, such as driven member 40. In this embodiment, a driven member 70 includes an outer ring 72 and a plurality of internal supports 74 coupled to a hub 76. Also coupled to hub 76 are a plurality of blades 78. In operation, a driving member, such as first driving member 22, or a pair of driving members, such as first driving member 22 and first driving member 32, are placed in proximity to outer ring 72 to rotate driven member 70. As driven member 70 rotates, blades 78, which are fixed to outer ring 72 by hub 76 and internal supports 74, rotate, thereby producing an aerodynamic force. In a manner similar to that illustrated in FIG. 3, the driving member(s) driving driven member 70 can be moved relative to outer ring 72 to either decrease the magnetic fields between the driving member (s) and driven member 70 or to vary the ratio between the driving member(s) and driven member 70.

Figure 6:
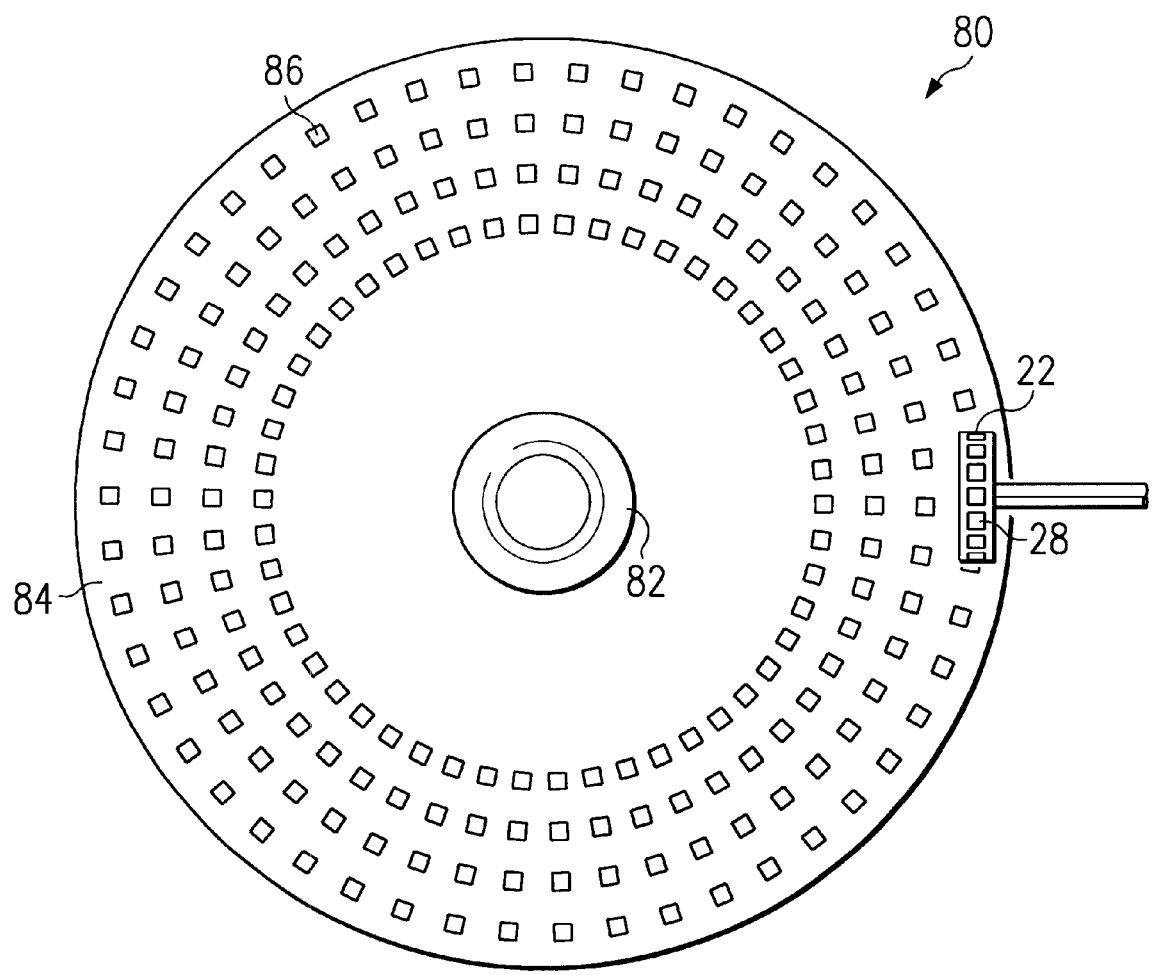
FIG. 6 illustrates an alternative embodiment of a driven member for a drive in accordance with the present invention.

FIG. 6 illustrates a previously mentioned alternative embodiment of a driven member, such as driven member 40. In this embodiment, a driven member 80 includes a shaft 82 and a first face 84. Coupled to first face 84 are a plurality of magnets 86.

Magnets 86 may be NdFeB magnets or any other type of permanent magnets and may be adhered to, bonded to, embedded in, molded with, or otherwise coupled to first face 84 of driven member 80. Driven member 80 may be composed of copper, aluminum, brass, composite, plastic, or any other type of conductive or nonconductive material.

In the operation of this embodiment, driven member 80 is driven by the interaction of the magnetic fields of its magnets 86 and of the magnets on a driving member, such as magnets 28 on first driving member 22, rather than depending solely upon any induced magnetic fields in driven member 80.

Although angled magnetic drive 10 has been described with respect to aerodynamic applications, angled magnetic drive 10 is useful for a variety of other applications. In general, angled magnetic drive 10 is useful for transferring rotary power from about one axial direction to about another axial direction to drive various types of rotary devices.

Although several embodiments of the invention have been illustrated and described, numerous other embodiments may readily be suggested to one skilled in the art through additions, deletions, alterations, and/or substitutions to the described embodiments. It is intended that the scope of the appended claims cover such additions, deletions, alterations, and/or substitutions.

What is claimed is:

1. An angled magnetic drive, comprising:
   a motor generating rotary motion about a first axis;
   a first driving member coupled to the motor and rotated thereby, said first driving member comprising a plurality of magnets coupled to a face thereof;
   a first driven member mounted to rotate about a second axis oriented at an angle to the first axis, at least part of a first face of the first driven member located in proximity to the face of the first driving member such that the first driven member magnetically couples to the first driving member when the motor rotates the first driving member, the rotation of the first driving member producing rotation of the first driven member;
   a second driving member coupled to the motor and rotated thereby, said second driving member comprising a plurality of magnets coupled to the face thereof; and
   a second driven, member mounted to rotate about a third axes oriented at an angle to the first axis, at least a part of a first face of the second driven member magnetically couples to the second driving member when the motor rotates the second driving member, the rotation of the second driving member producing rotation of the second driven member.

2. The magnetic drive of claim 1, wherein the angle between the first axis and the second axis and the first axis and the third axis comprises approximately ninety degrees.

3. The magnetic drive of claim 1, wherein the motor comprises a positionable driving shaft coupling the first and second driving member to the motor, whereby the positionable shaft moves the first and second driving member with respect to the first and second driven members to vary the power coupled from the motor to the driven members.

4. The magnetic drive of claim 1, wherein the rotation of the first and second driving members produces the magnetic coupling between the driving members and the first and second driven members.

5. An angled magnetic drive, comprising:
   a first motor generating rotary motion at a motor shaft about a first axis;
   a first driving member coupled to the motor shaft to rotate about the first axis, said first driving member comprising a plurality of magnets coupled to a face thereof;
   a second motor generating rotary motion at a motor shaft about a second axis;
   a second driving member coupled to the motor shaft of the second motor to rotate about the second axis, said second driving member comprising a plurality of magnets coupled to a face thereof; and
   driven member mounted to rotate about a third axis oriented at an angle to the first axis and the second axis, at least part of a first face of the driven member located in proximity to the face of the first driving member and at least part of a second face of the driven member located in proximity to the face of the second driving member;
   wherein the driven member magnetically couples to the first driving member when the first motor rotates the first driving member and to the second driving member when the second motor rotates the second driving member, the rotation of one or both of the first driving member and the second driving member producing rotation of the driven member.

6. The magnetic drive of claim 5, wherein the angle between the first axis and the third axis comprises approximately ninety degrees.

7. The magnetic drive of claim 5, wherein:
   the first motor comprises a drive for retracting and extending the motor shaft to move the first driving member with respect to the driven member to vary the radius ratio and thereby the power coupled from the first motor to the driven member; and
   the second motor comprises a drive for retracting and extending the motor shaft to move the second driving member with respect to the driven member to vary the radius ratio and thereby the power coupled from the second motor to the driven member.

8. An angled magnetic drive, comprising:
   a motor generating rotary motion about a first axis;
   a first driving member coupled to the motor and rotated thereby, the first driving member comprising a plurality of magnets coupled to a face thereof;
   a first driven member mounted to rotate about a second axis at an angle to the first axis, at least part of a first face of the first driven member located in proximity to the face of the first driving member;
   a second driving member coupled to the motor and rotated thereby, the second driving member comprising a plurality of magnets coupled to a face thereof; and
   a second driven member mounted to rotate about a third axis, at least part of a first face of the second driven member located in proximity to the face of the second driving member;
   wherein the first driven member and the first driving member magnetically couple when the motor rotates the first driving member, causing the first driven member to rotate, and the second driven member and the second driving member magnetically couple when the motor rotates the second driving member, causing the second driven member to rotate.

9. The magnetic drive of claim 8, wherein the angle between the first axis and the second axis comprises approximately ninety degrees.

10. The magnetic drive of claim 8, wherein the motor operates to rotate the first driving member and the second driving member in opposite directions.

11. The magnetic drive of claim 8, further comprising:
    a first driving shaft coupled between the motor and the first driving member; and a second driving shaft coupled between the motor and the second driving member.

12. The magnetic drive of claim 11, wherein:

the motor operates to retract and extend the first driving shaft with respect to the first driven member, thereby varying a radius ratio and power coupled from the motor to the first driven member; and the motor operates to retract and extend the second driving shaft with respect to the second driven member, thereby varying power coupled from the motor to the second driven member.

13. The magnetic drive of claim 8, wherein the rotation of the first driving member produces the magnetic coupling between the first driving member and the first driven member.

14. An angled magnetic drive, comprising:

a motor producing a rotary motion about a first axis;

a first driving member coupled to the motor and rotated thereby, the first driving member comprising a plurality of magnets coupled to a face thereof;

a second driving member coupled to the motor and rotated thereby, the second driving member comprising a plurality of magnets coupled to a face thereof;

a first driving shaft coupled between the motor and the first driving member;

a second driving shaft coupled between the motor and the second driving member; wherein:

the motor operates to retract and extend the first driving shaft to move the first driving member towards and away from, respectively, the motor; and the motor operates to retract and extend the second driving shaft to move the second driving member towards and away from, respectively, the motor.

15. The magnetic drive of claim 14, wherein the motor further operates to rotate the first driving member and the second driving member in opposite directions.

16. An angled magnetic drive, comprising:

a motor generating rotary motion about a first axis;

a driving member coupled to the motor and rotated thereby, said driving member comprising a plurality of magnets coupled to the face thereof;

a driven member mounted to rotate about a second axis oriented at an angle to the first axis, at least a part of a first face of the driven member located in proximity to the face of the driving member such that the driven member magnetically couples to the driving member when the motor rotates the driving member, the rotation of the driving member producing rotation of the driven member; and wherein the motor comprises a positionable driving shaft coupling the driving member to the motor, whereby the positionable shaft operates to retract and extend the driving member with respect to the driven member to vary the power coupled from the motor to the driven member.

* * * * *